United States Patent [19]

Satoh

[11] Patent Number: 5,388,031
[45] Date of Patent: Feb. 7, 1995

[54] THREE-PHASE TO SINGLE-PHASE POWER SUPPLY CONVERTER FOR WELDING EQUIPMENT

[76] Inventor: Ryoda Satoh, 8-25, Ohamacho 1-chome, Amagasaki-shi, Hyogo-ken, Japan

[21] Appl. No.: 710,985

[22] Filed: Jun. 6, 1991

[30] Foreign Application Priority Data

| Jun. 8, 1990 | [JP] | Japan | 2-150585 |
| Jun. 8, 1990 | [JP] | Japan | 2-150586 |
| Jun. 8, 1990 | [JP] | Japan | 2-150587 |
| Jun. 8, 1990 | [JP] | Japan | 2-150589 |
| Sep. 19, 1990 | [JP] | Japan | 2-253179 |
| Sep. 19, 1990 | [JP] | Japan | 2-253180 |

[51] Int. Cl.⁶ .................................. B23K 9/10
[52] U.S. Cl. .......................... 363/149; 219/130.1
[58] Field of Search ............ 219/130.1, 137 PS; 363/148, 149, 151

[56] References Cited

U.S. PATENT DOCUMENTS

4,435,632  3/1984  Risberg ................. 219/137 PS

FOREIGN PATENT DOCUMENTS

2039167  7/1980  United Kingdom ............ 219/130.1

*Primary Examiner*—Clifford C. Shaw
*Attorney, Agent, or Firm*—Sughrue, Mion, Zinn, Macpeak and Seas

[57] ABSTRACT

A power supply unit comprises three input terminals connected to a three-phase A.C. power supply, a phase control circuit controlling the firing of the three-phase A.C. for each phase, and a transformer comprising a single-phase iron core wound by first to third coils at the primary side and by a single-phase coil at the secondary side, and in which the first to third primary coils are connected to the three-phase A.C. power supply. It outputs a single-phase A.C. having a frequency three times that of the input current.

1 Claim, 5 Drawing Sheets

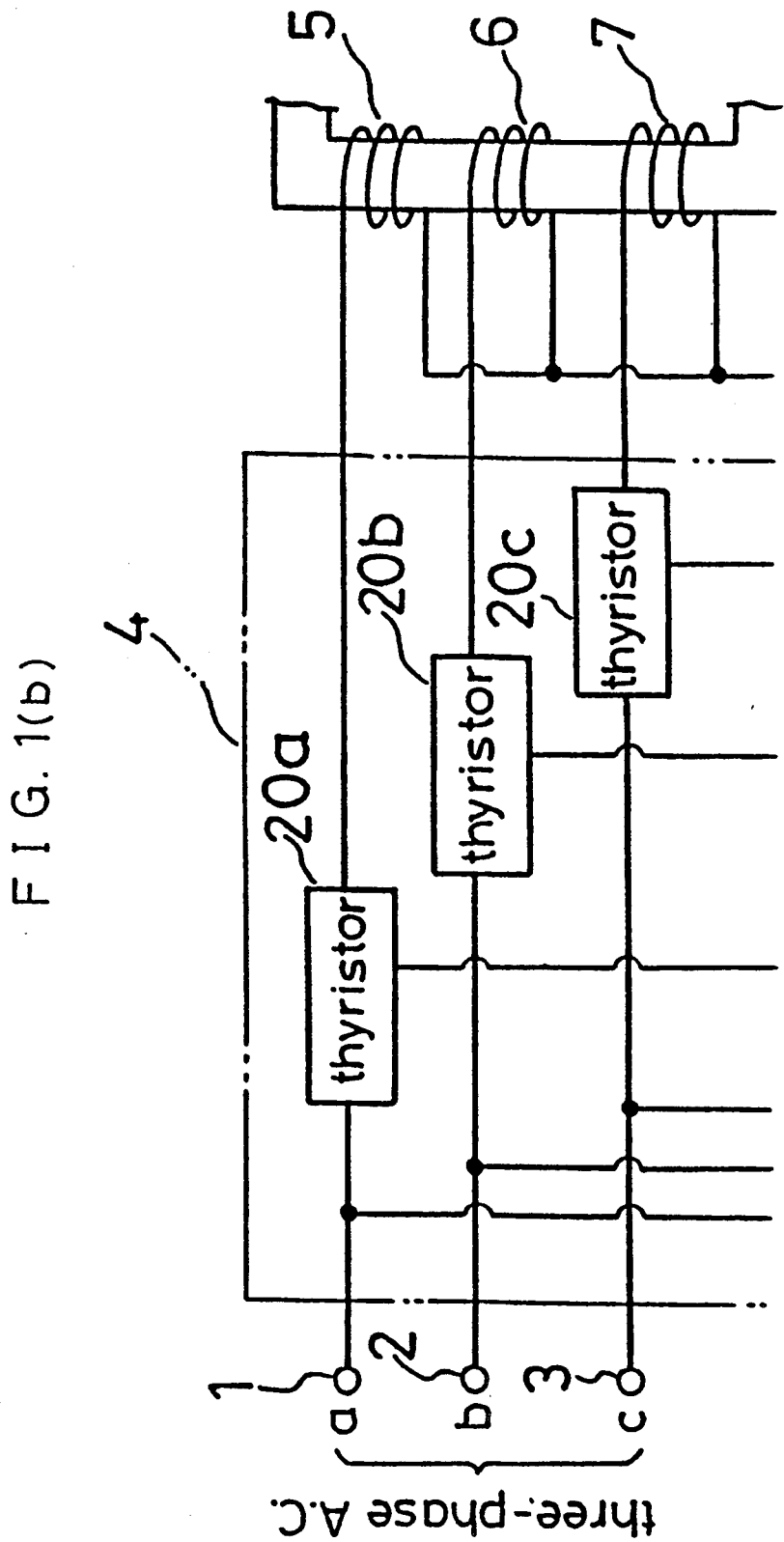

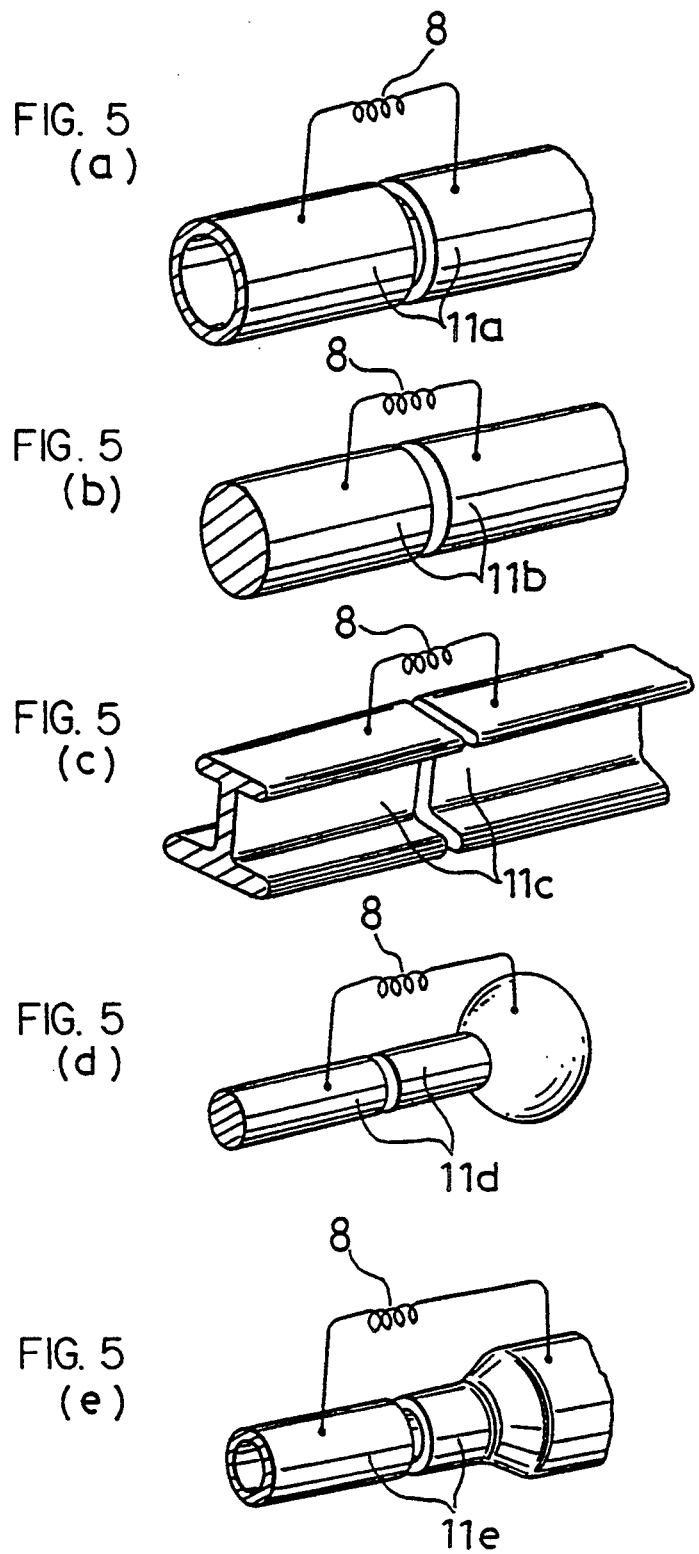

THREE-PHASE TO SINGLE-PHASE POWER SUPPLY CONVERTER FOR WELDING EQUIPMENT

FIELD OF THE INVENTION

The present invention relates to a power supply unit converting a three-phase alternating current (hereinafter referred to as A.C.) to a single-phase A.C. and, more particularly, to a single-phase A.C. power supply unit capable of obtaining high efficiency as a power supply of an A.C. arc welding equipment, a spot welding equipment, an arc welding or submerged welding equipment installed in a robot, a lighting equipment, a vibrator, an electric heater, or the like and to a welding equipment using the same.

BACKGROUND OF THE INVENTION

A single-phase A.C. is usually used as a power supply of such as a spot welding equipment, a lighting equipment, an electric motor, or an electric heater. To obtain the single-phase A.C., a device for converting a three-phase A.C. to a single-phase A.C. such as a Scott wiring, a three-phase low frequency system, and an inverter system is used, but in case of using the device, the unbalance between three phases occurs as the current increases and the efficiency of the electric power is low. The above-described power supply unit such as Scott wiring has a complicated circuit construction and a large size and it cannot take out a stable current because a twice excessive current flows in one of three phases. As well, in case of using the three-phase low frequency system as a power supply unit of the spot welding equipment, the equipment is of large-sized, expensive, and likely to have frequent problems.

Since the arc welding equipment generally requires a large amount of current, two kinds of power supply systems, that is, a magnetic leakage system and a reactor system are employed therefor. The former utilizes a magnetic leakage transformer as a transformer and the latter is one constituted by inserting a saturable reactor in series in a discharging circuit comprising a secondary side of a transformer and an arc electrode. These systems can provide an output having a drooping characteristic that the value of the output voltage abruptly rises up to a high voltage and thereafter drops swiftly as in arc welding, but the magnetic leakage and the reactance of the reactor cause a large loss in the output.

One of recently adopted systems is an inverter system that rectifies an A.C. and raises the frequency of the A.C. from about several hundred cycles to about 1200 cycles, and then inputs the A.C. to a transformer and again rectifies the output of the transformer so as to obtain a D.C. as an output of a secondary side. The use of the inverter system enables to make the transformer of small-sized and lightweight but the system is extremely expensive as well as of bad efficiency and likely to have frequent troubles. Since a single-phase A.C. power supply unit of 200 volts is used as a power supply in any system, the secondary side output is apt to be affected by pulsation of the A.C., and especially it fluctuates in the neighborhood of the zero point in the sinusoidal wave of the A.C. Therefore, the arc welding equipment requires keeping a proper distance between a welding rod and a weldment to suppress arcs, and the welding operation such as travel speed control requires a great deal of skill. Therefore, such welding equipment requires a small-sized and lightweight, and high efficiency power supply unit.

In addition, as shown in FIG. 6, the conventional multi-arc welding equipment includes a three-phase transformer 16 having a primary and a secondary coil 28 and 29 and applies three-phase output Generated at the secondary coil 29 to the three welding electrodes to generate multiple-arcs between the welding electrodes and the weldment and between welding electrodes for carrying out the multiple-arc (hereinafter referred to as multi-arc) welding.

SUMMARY OF THE INVENTION

According to a first aspect of the present invention, a power supply unit comprises three terminals connected to a three-phase A.C. power supply, a phase control circuit controlling the supply of a three-phase A.C. to be carried out only in a phase range of, for example, from about 120° to 180° for respective phases, and a transformer having an iron core which is wound by first to third primary coils at the primary side and a secondary coil at the secondary side and in which the three primary coils are connected to the terminals of the three-phase A.C. power supply via the phase control circuit. The power supply unit having such construction outputs a single-phase A.C. Therefore, the electricity is applied to the first, second, and third coils only in a range from about 120° to 180° of the A.C. sinusoidal waveform of respective phases by the firing control carried out by the phase control circuit, so that a magnetic flux of sawtooth waveform having a frequency three times that of the input three-phase A.C. is Generated at the iron core, whereby a single-phase A.C. having such a drooping characteristic that the voltage value rises up abruptly and thereafter drops down swiftly is induced in the secondary coil. This makes it possible to obtain a small-sized and lightweight, and high efficiency power supply unit.

BRIEF DESCRIPTION OF THE DRAWINGS

FIGS. 5(*a*) to 5(*e*) are diagrams illustrating materials being welded to each other by the arc welding equipment in accordance with a first embodiment of the present invention.

DETAILED DESCRIPTION OF THE PREFERRED EMBODIMENT

Figure 1A:
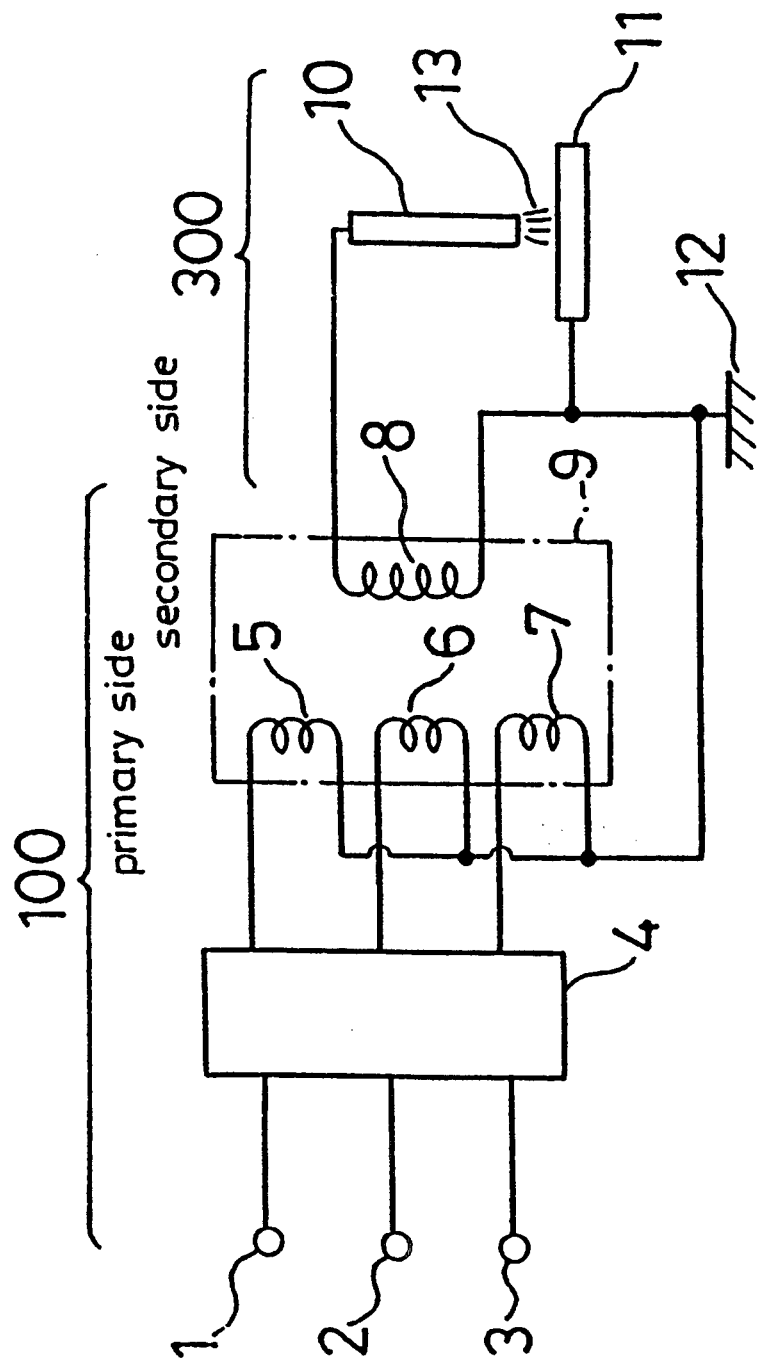
FIGS. 1(*a*) and 1(*b*) are diagrams illustrating a power supply unit used in an arc welding equipment in accordance with a first embodiment of the present invention.

An embodiment of the present invention will be described in detail with reference to the drawings.

FIG. 1(*a*) is a diagram illustrating an arc welding equipment provided with a power supply unit in accordance with a first embodiment of the present invention. In FIG. 1(*a*), reference numerals 1, 2, and 3 designate terminals connected to a three-phase A.C. power supply. A phase control circuit 4 controls the supply of the three-phase A.C. to be carried out only in a phase range from 120° to 180° for respective phases. A transformer 9 comprises an iron core comprising an laminated Silicon steel plate wound by first to third primary coils 5, 6, and 7 at the primary side and a secondary coil 8 at the secondary side. One end of the secondary coil 8 is grounded to the ground 12. A power supply unit 100 is constituted by the phase control circuit 4 and the transformer 9. In a welding part 300, a welding electrode 10 is provided connected to the secondary coil 8 and a weldment or workpiece 11 is connected to the ground 12 of the secondary coil 8, and an arc welding is carried out by firing an arc 13 between the welding electrode 10 and the secondary coil 8.

FIG. 1(b) is a diagram showing the detail of the phase control circuit 4 of FIG. 1(a). In FIG. 2(b), reference numerals 20a, 20b, and 20c designate thyristors. A zero cross point detector 21 detects a zero cross point of the sinusoidal wave of respective phases in the three-phase A.C. Phase adjusters 22a, 22b, and 22c receive outputs from the zero cross point detector 21 and control firing angles of the thyristors 20a, 20b, and 20c.

A description is given of the operation.

Figure 2A:
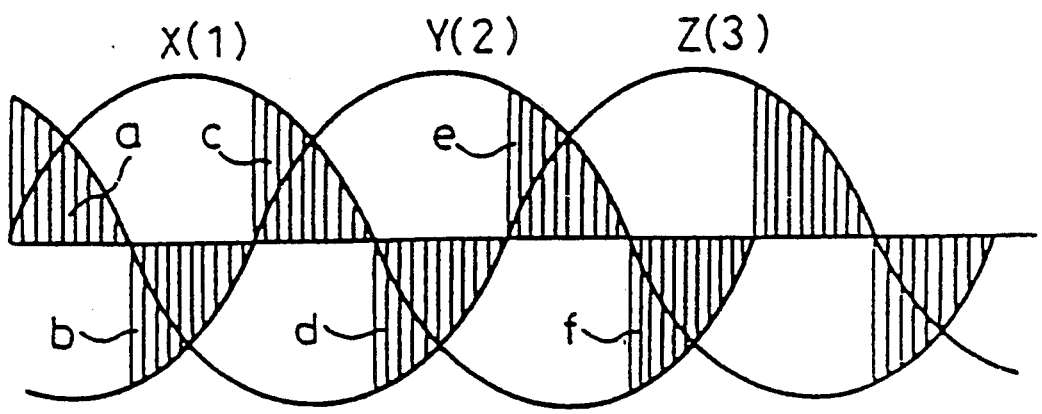
FIGS. 2(*a*) to 2(*c*) are diagrams illustrating an output waveform of the power supply unit of FIG. 1.
Figure 2B:
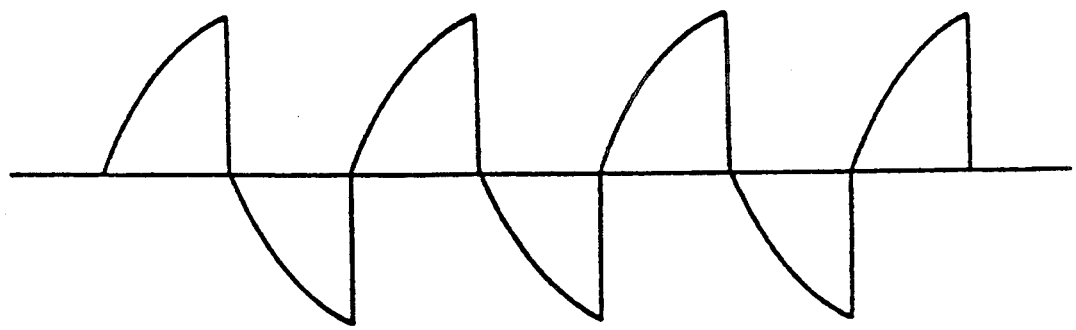
Figure 2C:
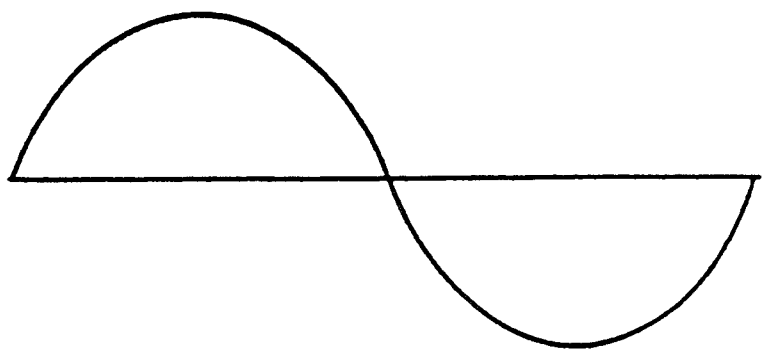

A phase control circuit 4 controls the supply of the electricity from the terminals of three-phase A.C. power supply 1, 2, and 3 to the first coil 5, the second coil 6, and the third coil 7 of the transformer 9 to be carried out only in a phase range from 120° to 180° of the A.C. sinusoidal waveforms X, Y, and Z shown in FIG. 2(a) (regions c and f of the phase X, regions b and e of the phase Y, and regions a and d of the phase Z) and makes the coils in an open circuit state outside of the phase range. Repeated application of the electricity to respective coils 5, 6, and 7 as described above induces in the iron core a magnetic flux of FIG. 2(b) having the drooping characteristics of a frequency three times that of the input current shown in FIG. 2(c), and further the sawtooth waveform current of threefold frequency shown in FIG. 2(b) is also induced in the secondary coil 8.

Thereafter, the sawtooth waveform current of the threefold frequency is applied to the welding electrode 10 at the welding part 300 and arcs 13 are fired between the electrode 10 and the weldment 11 to result in the arc welding. This equipment has the following effects (1) to (10).

Figure 3A:
FIGS. 3(*a*) and 3(*b*) are diagrams for explaining an operation of the arc welding equipment of FIG. 1.
Figure 3B:
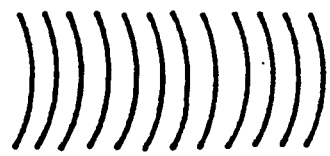

(1) Since the three-phase A.C. is changed into the single phase A.C., the unbalance of the input electric power between the three phases does not occur. The single-phase output at the secondary side has the frequency three times as that of the three-phase A.C. at the primary side, that is, 180 cycles against single phase 60 cycles, thereby enabling to reduce welding time to a third of the welding time using the conventional three phase/single phase conversion power supply unit. If the welding is carried out at the same speed as in the conventional one, the arcs fired by this equipment shown in FIG. 3(a) will be three times as close as in the conventional one shown in FIG. 3(b), thereby enabling to enhance the quality of the welding.

(2) Contrary to the conventional three phase/single phase conversion power supply unit generates a single-phase sinusoidal waveform output, the power supply unit of this embodiment generates a single-phase sawtooth waveform output whose value rises up abruptly to a high level and then falls down swiftly to zero, thereby enabling to easily obtain a stable arc in welding. In other word, the power supply unit of this embodiment has a drooping characteristic which is favorable in arc welding.

Figure 4:
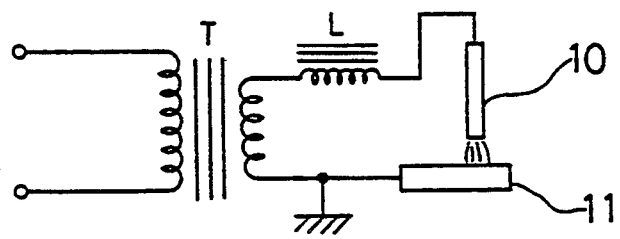
FIG. 4 is a diagram illustrating a prior art arc welding equipment using a saturable reactor.
Figure 6:
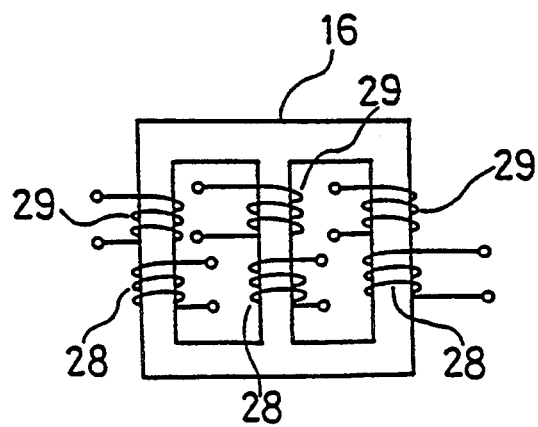
FIG. 6 is a diagram illustrating a prior art three-phase transformer.

(3) Since the power supply unit of this embodiment has the drooping characteristics, an equipment such as a magnetic leakage system or a saturable reactor L of FIG. 4, which is conventionally utilized to obtain the drooping characteristics is not requested, thereby avoiding loss of power and lowering of the power utilization factor.

(4) In this embodiment, the frequency of the output is three times as that of the conventional output, so that the transformer can be miniaturized to be of a third in size, and this makes it possible to reduce the production cost.

(5) Since the power supply unit of this embodiment requires no-load voltage of only 35 V to 55 V while the conventional one requires that of 60 V to 100 V, it can be handled safely and easily without great deal of skill. In addition, the automatization of the welding equipment is easily possible.

(6) A proper control of the firing angle of sinusoidal waveform of one phase at approximately 120° allows to adjust the intensity of the arc. This fact is that the phase range can be controlled to be wider than the conventional and that the region which could not be conventionally welded can be welded by utilizing an automatic control by a computer with high stability.

(7) Since the power supply unit is of small-sized, lightweight, and fires stable arcs, when mounted in a robot, the arc welding of a large-sized thick plate is possible. This means that the welding equipment of this embodiment has the weight the same as and the welding ability three times as that of the conventional one.

(8) The power supply unit of this embodiment can be utilized in a large-scaled arc flame spraying. The use of a multiple of power supply units of this embodiment enables to carry out simultaneously the flame spraying of different kinds of metals, that is, the alloy flame spraying, owing to the characteristics of the sawtooth waveform current of the threefold frequency.

(9) The use of the power supply unit of this embodiment in the mig welding instead of the conventional arc welding enables to rise the welding speed to a three times speed or to employ a welding wire having a twice cross section.

(10) By applying the sawtooth waveform voltage of the threefold frequency generated at the secondary coil to two weldments 11a to 11e as shown in FIGS. 5(a) to 5(e), producing an inert atmosphere around the same, and making the firing easy by utilizing such as metal grain or conducting firing with remaining a gap at high frequency, the weldments having a large diameter can be welded at the same time. At this time, it is more preferable to apply the forge press or vibration press.

What is claimed is:

1. A power supply unit comprising:
   three input terminals connected to a three-phase A.C. power supply;
   a phase control circuit controlling the supply of the three-phase A.C. for each phase;
   a transformer comprising a single-phase iron core which is wound by first, second and third phase primary coils at a primary side and by a single-phase secondary coil at a secondary side and in which said first, second and third phase primary coils are connected to said three-phase A.C. power supply via said phase control circuit; and
   an output terminal outputting a single-phase A.C., wherein said phase control circuit controls the supply of the three-phase A.C. only in an angular range from approximately 120° to 180° for each phase.

* * * * *